(12) United States Patent
Kato et al.

(10) Patent No.: US 6,325,567 B1
(45) Date of Patent: Dec. 4, 2001

(54) ARM MEMBER

(75) Inventors: Rentaro Kato; Yuichi Ogawa; Koji Uchino, all of Kasugai; Masaharu Tochigi, Tochigi; Naoyuki Kawata, Tochigi; Takenori Hashimoto, Tochigi, all of (JP)

(73) Assignees: Tokai Rubber Industries, Ltd.; Showa and Denko K.K., both of (JP)

( * ) Notice: Subject to any disclaimer, the term of this patent is extended or adjusted under 35 U.S.C. 154(b) by 0 days.

(21) Appl. No.: 09/388,306

(22) Filed: Sep. 1, 1999

(30) Foreign Application Priority Data

Sep. 2, 1998 (JP) .................................................. 10-247969

(51) Int. Cl.[7] .................................................. B23K 20/12
(52) U.S. Cl. ...................... 403/270; 403/335; 228/112.1
(58) Field of Search ....................................... 403/270, 271, 403/272, 335–336, 375, 24, 79; 288/288.1, 288.9; 464/183; 228/112.1, 114.5

(56) References Cited

U.S. PATENT DOCUMENTS

| 4,289,557 | * | 9/1981 | Stanwood et al. .................... 156/171 |
| 4,358,284 | * | 11/1982 | Federmann et al. .................. 464/181 |
| 4,527,987 | * | 7/1985 | Zackrisson ........................... 464/183 |
| 4,820,241 | * | 4/1989 | Nakamura ............................ 464/183 |
| 6,244,496 | * | 6/2001 | Kato et al. ........................ 228/112.1 |

FOREIGN PATENT DOCUMENTS

| 28 45 345 A1 | 6/1980 | (DE) . |
| 10 90 976 | 4/1991 | (DE) . |
| 199 11 121 (A1 | 9/1999 | (DE) . |
| 8-230 427 (A) | 9/1996 | (JP) . |
| 9-188 115 (A) | 7/1997 | (JP) . |

* cited by examiner

Primary Examiner—Harry C. Kim

(57) ABSTRACT

An arm member is used as, for example, a suspension arm of an automobile. The arm member comprises a main body made of a pipe member and a coupling member having a connecting portion. The pipe member is made of aluminum or its alloy. The coupling member is made of aluminum and includes a bushing mounting portion for mounting a vibroisolating bushing. The thickness of the peripheral wall of the end portion of the main body is increased in thickness to have a thickness thicker than that of the other portion of the main body. The connecting portion is abutted to the peripheral wall of the end portion to form an abutted portion, and connected thereto at the abutted portion. Thus, the coupling member is coupled to the main body.

5 Claims, 8 Drawing Sheets

ARM MEMBER

BACKGROUND OF THE INVENTION

1. Field of the Invention

The present invention relates to an arm member for use as, for example, an automobile suspension arm or an engine mount, and more particularly, to an arm member which is to be coupled with the other members and includes a coupling member with a bushing mounting portion, a yoke portion, a ball joint mounting portion, or the like.

The term "aluminum" used in this specification denotes aluminum and its alloys.

2. Description of the Related Art

FIGS. 8A and 8B illustrates an arm member 51 for use as an automobile suspension arm such as an upper arm, a lower arm, a trailing arm and a torsion arm.

The arm member 51 comprises a main body 52 and a pair of metallic coupling members 55 each connected to the respective end portion 53 of the main body 52. The main body 52 is made of a metallic cylindrical pipe having a predetermined length in order to lighten the arm member 51.

The coupling member 55 comprises a cylindrical bushing mounting portion 57 for mounting a columnar vibroisolating bushing 61 with a rubber elastic member, a columnar connecting portion 58 integrally outwardly protruded from an outer surface of the bushing mounting portion 57, and a columnar fitting protrusion 59 integrally outwardly protruded from the central portion of the end surface of the connecting portion 58. The fitting protrusion 59 has a diameter smaller than that of the connecting portion 58. The bushing mounting portion 57 has a circular bushing mounting opening 56. The vibroisolating bushing 61 is forcibly fitted in the bushing mounting opening 56 and secured therein.

In this arm member 51, as shown in FIG. 8B, the stepped end of the connecting portion 58 of the coupling member 55 is abutted to the end of the peripheral wall at the end portion 53 of the main body 52 to form an abutted portion 60. The coupling member 55 is connected to the main body 52 at the abutted portion 60. In this state, the fitting protrusion 59 of the coupling member 55 is tightly fitted in or forcibly fitted in the opening 52a of the end portion 53 of the main body 52. In FIG. 8B, the portion W' is a welded portion formed along the entire circumference of the abutted portion 60.

For joining the abutted portion 60, various joining methods can be adapted, such as a fusion welding method including a MIG welding, a TIG welding or a laser welding, or a friction agitation joining or welding method (hereinafter referred to as "friction agitation joining method) which is one type of solid-phase joining (welding) methods. In the arm member 51 shown in FIGS. 8A and 8B, the abutted portion 60 is joined, or welded, by a friction agitation joining method.

The friction agitation joining method will be explained as follows. In FIG. 8B, the reference numeral 70 denotes a joining tool for a friction agitation joining method. The joining tool 70 includes a columnar rotor 71 having a larger diameter and a pin-like probe 72 having a smaller diameter protruded from an end surface 71a of the rotor 71 along the axis of the rotor 71. The probe 72 rotates as the rotor 71 rotates. The rotor 71 and the probe 72 are harder than the main body 52 and the coupling member 55, and made of heat-resistant materials which can stand friction heat generated during the joining process. Convex portions (not shown) for agitating or stirring the softened materials are formed on the surface of the probe 72.

In the arm member 51, the main body 52 and the coupling member 55 are joined according to the following steps. First, while rotating the probe 72 on the rotor 71 of the joining tool 70, the rotating probe 72 is inserted into the abutted portion 60. Then, the rotating probe 72 is moved in the circumferential direction of the abutted portion 60 while softening and agitating the portion where the rotating prove 72 contacts by the friction heat. Thus, the abutted portion 60 is joined, or welded, along the entire circumference thereof. As a result, the coupling members 55 are coupled to the main body 52.

The arm member 51 is to be connected to the other member of an automobile (not shown) via the vibroisolating bushing 61 mounted in the bushing mounting opening 56 of the coupling member 55. Therefore, the main body 52 and the coupling members 55 must be joined firmly.

However, a conventional arm member, in which the main body and the coupling member are joined by a joining method such as a fusion welding (a MIG welding, a TIG welding, a laser welding, or the like) or a solid-phase welding method (a friction agitation joining method), may cause cracks at or approximate to the joined portion W' when a tensile load is imparted thereto.

Furthermore, in the arm member 51, since the main body 52 is made of a pipe member in order to lighten the weight of the arm member 51, thermal fatigue tends to occur at or approximate to the joined portion W'. The thermal fatigue may cause cracks at or approximate to the joined portion W', resulting in an easy-broken arm member 51.

SUMMARY OF THE INVENTION

The present invention is made to solve the aforementioned disadvantages of the related art.

An object of the present invention is to provide an arm member which is light in weight and can prevent cracks from causing at or approximate to the joined portion, even though the main body of the arm member used for a suspension arm or an engine mount is made of a pipe member.

Other objects and advantages of the present invention will be apparent from the following preferred embodiments.

In order to attain the aforementioned object, according to the present invention, an arm member includes a main body made of a pipe member having a peripheral wall and a coupling member having a connecting portion. The peripheral wall of the end portion of the main body is formed to have a thickness thicker than that of the other portion of the main body. The connecting portion is abutted to the peripheral wall of the end portion to form an abutted portion, and joined thereto at the abutted portion, whereby the coupling member is coupled to the main body.

In this arm member, since the main body is made of a pipe member, the result is the arm member which is light in weight. Also, since the peripheral wall of the end portion of the main body is formed to have a thickness thicker than that of the other portion of the main body, the mechanical strength of the end portion of the main body is enhanced. Therefore, fracture or breakage at or approximate to the joined portion due to a tensile load or the like imparted thereto can be prevented from occurring. Furthermore, since the peripheral wall of the end portion of the main body is formed to have a thickness thicker than that of the other portion of the main body, thermal fatigue hardly occurs by the joining heat. This also can prevent the end portion of the main body from causing cracks at or approximate to the joined portion. As a result, even though the main body is made of a pipe member, the coupling member is firmly coupled to the main body. In other words, the arm member light in weight and high in joint strength can be provided.

In the aforementioned arm member, it is preferable that the peripheral wall of the end portion of the main body is radially outwardly increased in thickness. This structure simplifies the process of making the thick peripheral wall at the end portion of the main body.

Alternatively, the peripheral wall of the end portion of the main body may be radially inwardly increased in thickness.

It is preferable that a protruded portion integrally formed on the connecting portion is fitted in an opening of the end portion of the main body. This further enhances the mechanical strength of the peripheral wall of the end portion of the main body since the protruded portion fitted in the opening of the end portion of the main body reinforces the peripheral wall of the end portion of the main body from inside of the pipe member.

In the aforementioned arm member, the coupling member may have a bushing mounting portion for mounting a bushing with a rubber elastic member.

In the aforementioned arm member, the coupling member may have a yoke portion; or a ball joint mounting portion for mounting a ball joint.

In the aforementioned arm member, it is preferable that the pipe member and the coupling member are made of metal and the abutted portion is joined, or welded by a friction agitation joining method. The friction agitation joining method is one of the solid-phase joining or welding methods and generates joining heat less than that in a fusion welding method, which causes less thermal fatigue at the joined portion. Accordingly, the aforementioned arm member has almost no thermal fatigue at the joined portion, whereby cracks due to thermal fatigue at and approximate to the joined portion can be surely prevented from causing. Further, the friction agitation joining method has advantages in that it is possible to firmly join different kinds of metals. Accordingly, in the aforementioned arm member, even though the main body and the coupling member are made of different kinds of metals, the main body and the coupling member can be joined firmly.

In the aforementioned arm member, the pipe member and the coupling member may be made of metal and the abutted portions may be joined by a fusion welding method.

In the aforementioned arm member, it is preferable that the pipe member and the coupling member are made of aluminum and the abutted portion is joined by a friction agitation joining method.

According to this aspect of the present invention, since both of the main body and the coupling member are made of aluminum, the arm member becomes further light in weight. Furthermore, since the abutted portion is joined by the friction agitation joining method, cracks due to thermal fatigue at and approximate to the abutted portion can be surely prevented.

In the aforementioned arm member, the pipe member and the coupling member may be made of aluminum and the abutted portion may be joined by a fusion welding method.

BRIEF DESCRIPTION OF THE DRAWINGS

The above and other objects, features, and advantages of the present invention will be apparent from the following detailed description of the preferred embodiments with reference to the attached drawings, wherein:

FIG. 6 is a perspective view showing an end portion of a main body which a coupling member having a yoke portion is connected to;

FIG. 7 is a perspective view showing an end portion of a main body which a coupling member having a ball joint mounting portion is connected to;

DETAILED DESCRIPTION OF THE PREFERRED EMBODIMENTS

Preferred embodiments of the present invention will now be described, in detail with reference to the accompanying drawings.

The arm member 1 according to the embodiment is used as an automobile suspension arm.

Figure 1:
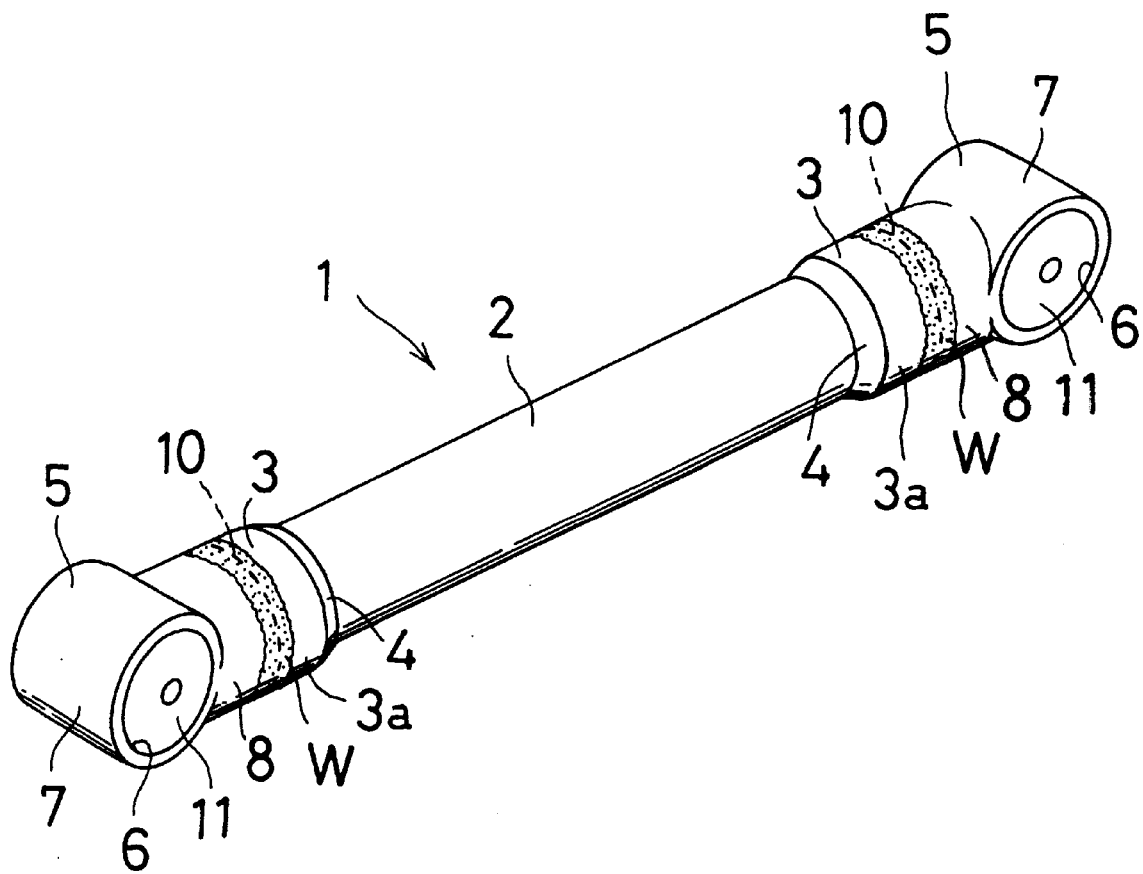
FIG. 1 is a perspective view showing an arm member according to an embodiment of the present invention.
Figure 2:
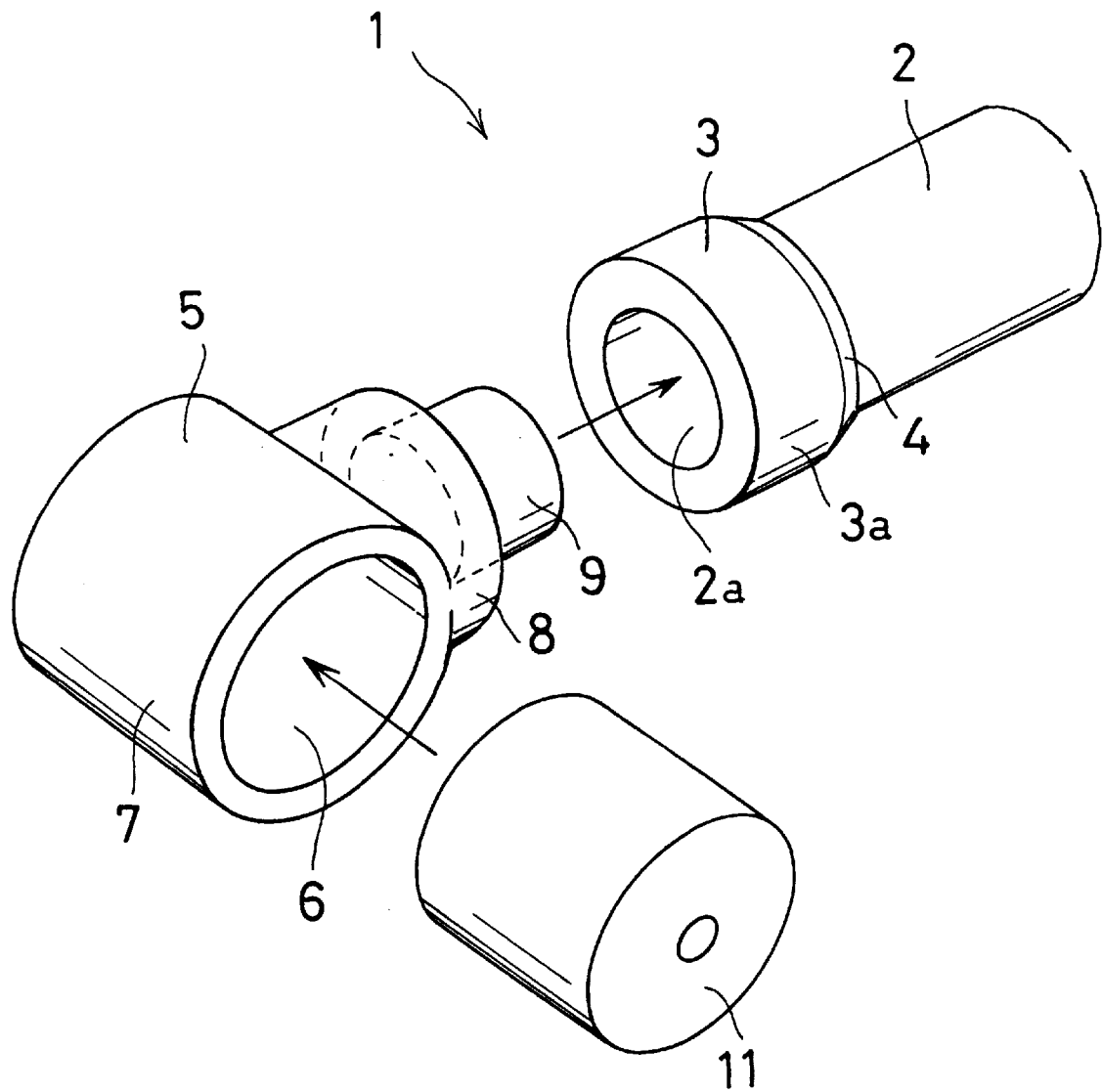
FIG. 2 is a perspective view of the arm member in a disassembled state.

FIGS. 1 to 4 illustrates an arm member 1 according to a first embodiment of the present invention. As shown in FIG. 1, the arm member 1 comprises a main body 2 made of an aluminum cylindrical pipe having a predetermined length and a pair of coupling members 5 and 5 made of aluminum die casting and connected to the longitudinal opposite end portions 3, 3 of the main body 2. As shown in FIG. 2, the peripheral wall of the end portion 3 of the main body 2 is made to have a thick peripheral wall 3a radially outwardly increased in thickness so as to have a thickness thicker than that of the other peripheral portion of the main body 2. Furthermore, in the main body 2, the outer surface of the peripheral wall of the end portion 3 is connected to the outer surface of the other peripheral wall of the other portion of the main body 2 via a tapered surface 4. This eases the stress concentration to be imparted to the stepped portion between the end portion 3 and the other portion of the main body 2.

Thickening the peripheral wall of the end portion 3 of the main body 2 can be easily performed by a known thickening processing in which a tube thickness of a certain portion in the longitudinal direction is increased by a plastic working such as a swaging processing, a rolling processing (such as a spinning processing), an extrusion processing, a drawing processing, a Pilger mill processing, and a partially heating and compressing processing.

The coupling member 5 has the same structure as that of the coupling member 55 of the aforementioned related art. As shown in FIG. 2, the coupling member 5 comprises a cylindrical bushing mounting portion 7 for mounting a columnar vibroisolating bushing 11 with a rubber elastic member, a columnar connecting portion 8 integrally provided on and protruded from an outer surface of the bushing mounting portion 7 and a columnar fitting portion 9 integrally provided on and protruded from the central portion of the end surface of the connecting portion 8. The fitting portion 9 has a diameter smaller than that of the connecting portion 8. The bushing mounting portion 7 has a bushing mounting opening 6 circular in cross-section. The vibroisolating bushing 11 is forcibly fitted into and secured in the bushing mounting opening 6. The arm member 1 is supposed to be connected to the other members (not shown) of an automobile via the bushing 11 fitted and secured in the bushing mounting opening 6.

The fitting portion 9 is formed to have the same diameter as or a slightly larger diameter than the inner diameter of an opening 2*a* of the end portion 3 of the main body 2 so that the fitting portion 9 is tightly fitted in or forcibly fitted in the opening 2*a*.

The connecting portion 8 is formed to have the same outer diameter as that of the end portion 3 of the main body 2. Thus, the outer surface of the connecting portion 8 is flash with that of the end portion 3 of the main body 2 when the fitting portion 9 is fitted into the opening 2*a* of the end portion 3 of the main body 2.

Figure 3A:
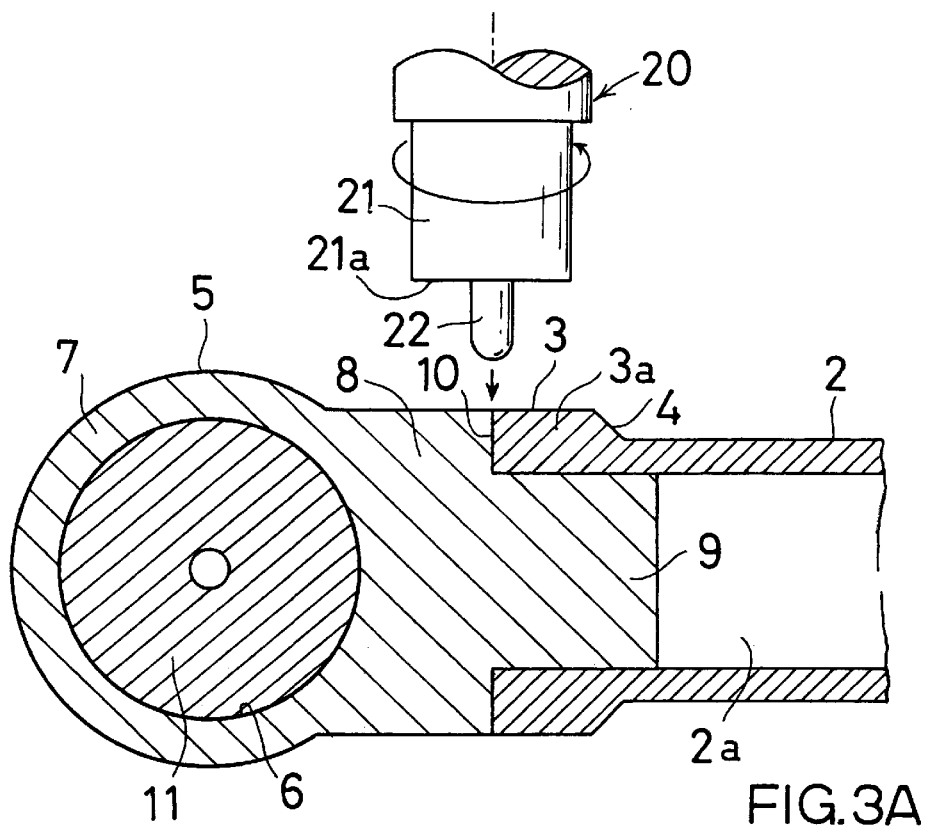
FIG. 3A is a cross-sectional view showing an end portion of a main body of the arm member before the joining process.

In the arm member 1 as shown in FIG. 1, the end surface of the connecting portion 8 is abutted to the end surface of the peripheral wall 3*a* of the end portion 3 of the main body 2 (as shown in FIG. 3A), and the abutted portion 10 is joined along the circumferential direction thereof by a friction agitation joining method. Thus, the main body 2 is connected to the coupling member 5. In this state, the fitting portion 9 of the coupling member 5 is fitted in the opening 2*a* of the end portion 3 of the main body 2. In FIG. 1, the reference letter W denotes a joined or welded portion formed along the entire circumference of the abutted portion 10 by the friction agitation joining method.

The friction agitation joining method will be explained as follows. In FIG. 3A, the reference numeral 20 denotes a joining tool for use in a friction agitation joining method. The joining tool 20 includes a columnar rotor 21 having a larger diameter and a pin-like probe 22 having a smaller diameter protruded from an end surface 21*a* of the rotor 21 along the axis of the rotor 21. The probe 22 rotates together with the rotor 21. The rotor 21 and the probe 22 are harder than the main body 2 and the coupling member 5, and made of heat-resistance materials which stand friction heat generated during the joining process. Convex portions (not shown) for agitating or stirring the softened materials are formed on the surface of the probe 22.

Figure 3B:
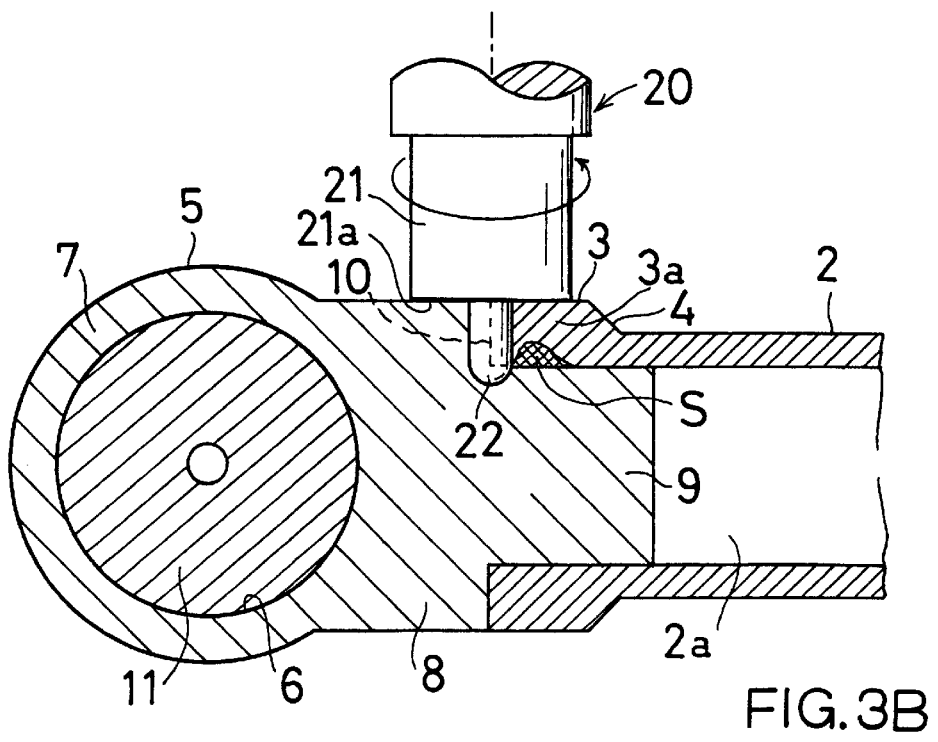
FIG. 3B is a cross-sectional view showing the end portion of the main body of the arm member during the joining process.
Figure 4A:
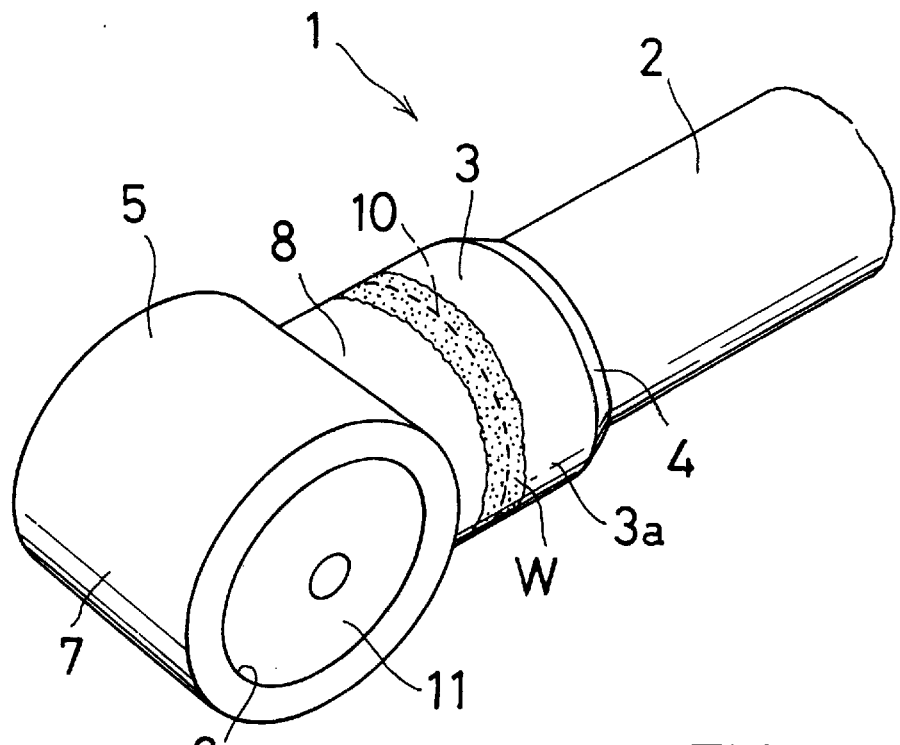
FIG. 4A is a perspective view showing the end portion of the main body in a joined state.
Figure 4B:
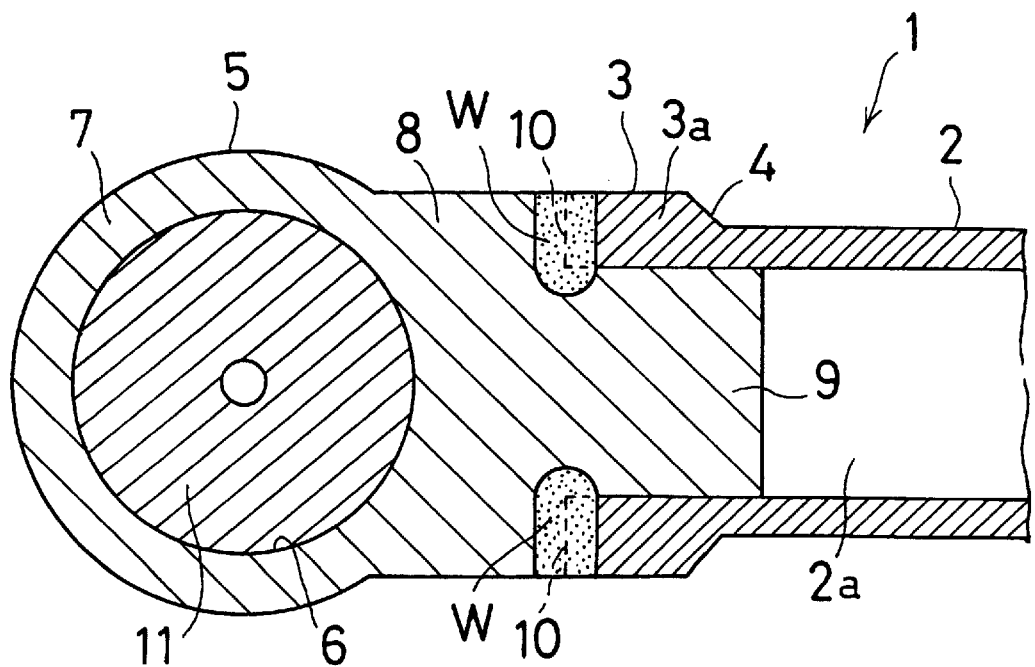
FIG. 4B is a cross-sectional view showing the end portion of the main body in a joined state.

While rotating the probe 22, the probe 22 is inserted into the abutted portion 10. As shown in FIG. 3B, it is preferable that the tip end of the probe 22 is inserted so as to reach the fitting portion 9 of the coupling member 5 beyond the inner peripheral surface of the end portion 3 of the main body 2, and that the end surface 21*a* of the rotor 21 touches both the outer surfaces of the end portion 3 and the connecting portion 8 so that friction heat can be effectively generated and the softened materials can be prevented from being scattered.

Then, in a state that the rotating prove 22 is being inserted in the abutted portion 10, the main body 2 is rotated together with the coupling member 5 about the axis of the main body 2. As a result, friction heat is generated by the friction between the rotating probe 22 and the portion where the rotating probe 22 contacts, and the friction between the end surface 21*a* of the rotating rotor 21 and the outer surfaces of the end portion 3 of the main body 2 and the connecting portion 8. The abutted portion 10 is softened by the friction heat generated at the contact portion where the rotating probe 22 contacts and its approximate portion. The softened portion is agitated or stirred by the rotating probe 22. In accordance with the rotation of the main body 1 and the coupling member 5, the softened and agitated materials are plastically fluidized to fill up a groove formed behind the probe 22. Then, the materials will be cooled and solidified by an immediate loss of the friction heat. This phenomenon will be repeated with the rotation of the main body 2 and the coupling member 5, which causes the main body 2 and the coupling member 5 to be joined, or welded, along the entire circumference of the abutted portion 10. The joining operation according to the friction agitation joining method may be performed such that the rotating probe 22 inserted in the abutted portion 10 is moved along the circumference of the abutted portion 10 in a state that the main body 2 and the coupling member 5 is fixed, i.e., not rotated.

As mentioned above, since the main body 2 is made of a pipe member, the arm member 1 is light in weight. Furthermore, the main body 2 and the coupling member 5 are made of aluminum, which further lightens the arm member 1.

Since the thickness of the peripheral wall at the end portion 3 of the main body 2 is made to be thick, the mechanical strength at the end portion 3 of the main body 2 is enhanced. In addition, since the fitting portion 9 of the coupling member 5 is fitted in the opening 2*a* of the end portion 3 of the main body 2, the mechanical strength at the end portion 3 of the main body 2 is further enhanced. Furthermore, since the joined or welded portion W is formed at the abutted portion 10 where the end portion 3 of the main body 2 enhanced in strength is abutted to the connecting portion 8, there is almost no thermal fatigue at the abutted portion 10. In other words, fracture or breakage will hardly occur at the joined portion W or a portion approximate to the joined portion W. Accordingly, when a tensile load is imparted to the arm member 1 in the axial direction, the arm member 1 will not be broken at the joined portion W or a portion approximate to the joined portion W. If the arm member 1 should be fractured or broken, the fracture or breakage will occur at a longitudinally intermediate portion of the main body 2. Thus, the arm member 1 has a high liability in strength.

Although the joining of the main body 1 and the coupling member 5 can be performed by a fusion welding such as a MIG welding, a TIG welding and a laser welding, this embodiment employs a friction agitation joining method requiring less joining heat as compared to the fusion welding, the thermal fatigue caused by the friction agitation joining is smaller than that caused by the fusion welding. As a result, the strength liability of the arm member 1 has been enhanced remarkably.

On the other hand, according to the friction agitation joining method which can remarkably enhance the strength liability, the following phenomenon may occur. As shown in FIG. 3B, the softened portion S near the probe 22, which is softened by friction heat, tends to be absorbed toward the probe 22 due to the rotational absorption force. This causes a decrease of the thickness of the portion near the joined portion, resulting in a deterioration of the joining strength. However, in this embodiment, since the peripheral wall of the end portion 3 of the main body 2 is formed to have a thick wall 3*a* as mentioned above, the thick wall 3*a* compensates the decrease of the thickness. Therefore, there will be almost no deterioration of a joint strength due to the decreased thickness. As a result, the high strength liability of the arm member 1 can be maintained.

Furthermore, since the friction agitation joining method generates a small amount of heat, the elastic characteristic of the rubber elastic portion of the bushing 11 will not be deteriorated by the joining heat. Therefore, in the arm member 1, the original elastic characteristic of the bushing 11 mounted in the bushing mounting opening 6 can be maintained.

Figure 5:
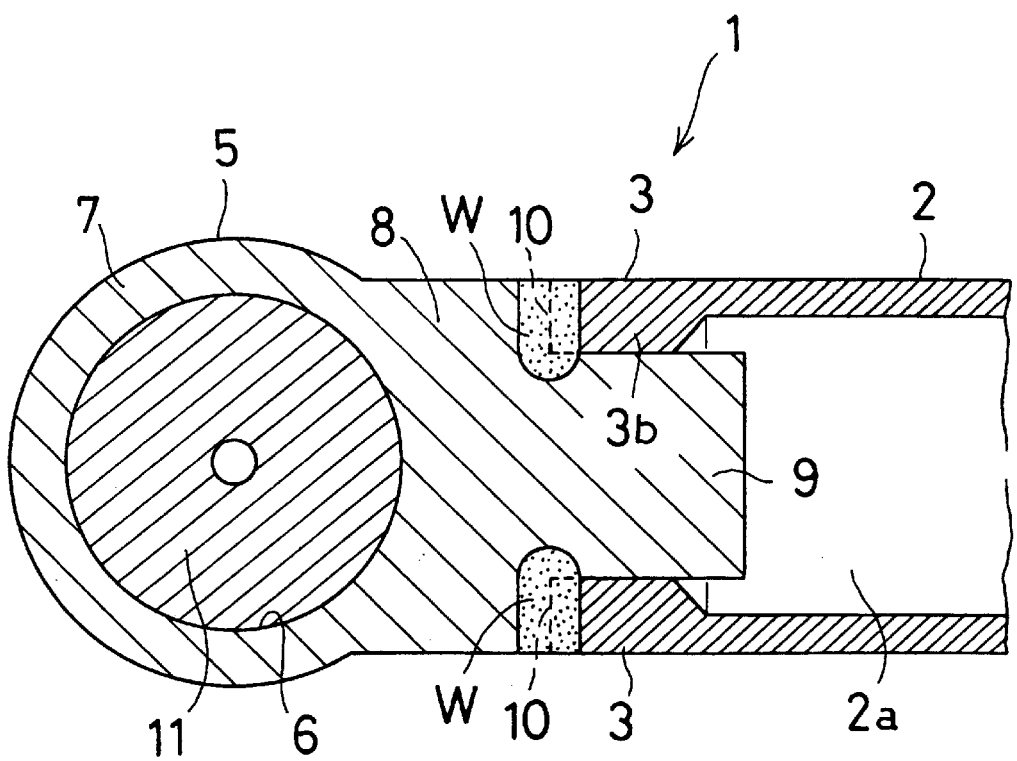
FIG. 5 is a cross-sectional view showing an end portion of a main body of an arm member according to another embodiment of the present invention.

FIG. 5 illustrates an arm member 1 according to another embodiment (a second embodiment) of the present invention. In this embodiment, the same reference numerals are allotted to the corresponding portions of the first embodiment. In this arm member 1, the peripheral wall of the end portion 3 of the main body 2 made of a pipe member, is radially inwardly increased in thickness to have a thick wall 3b. The stepped end surface of the connecting portion 8 is abutted to the end surface of the peripheral wall of the end portion 3 of the main body 2, and the abutted portion 10 is joined along the circumference thereof by the friction agitation joining method to have a joined or welded portion W. Thus, the main body 2 is connected to the coupling member 5. In this state, the fitting portion 9 of the coupling member 5 is fitted in the opening 2a of the end portion 3 of the main body 2.

It might be troublesome and difficult to form a radially inwardly thickened peripheral wall as in the arm member 1 according to the second embodiment. Therefore, it is preferable to radially outwardly increase the thickness to have a thick peripheral wall as in the arm member 1 according to the first embodiment.

The present invention is not limited to the above-mentioned first and second embodiments. For example, the pipe member constituting the main body 2 and the coupling member 5 may be made of an extruded article, casting, iron materials or other metallic materials, or synthetic resin.

The abutted portion 10 may be jointed by a fusion welding such as a MIG welding, a TIG welding, or a laser welding.

The arm member according to the present invention is not limited to a suspension arm, but may be used as, for example, an engine mount.

Figure 6:
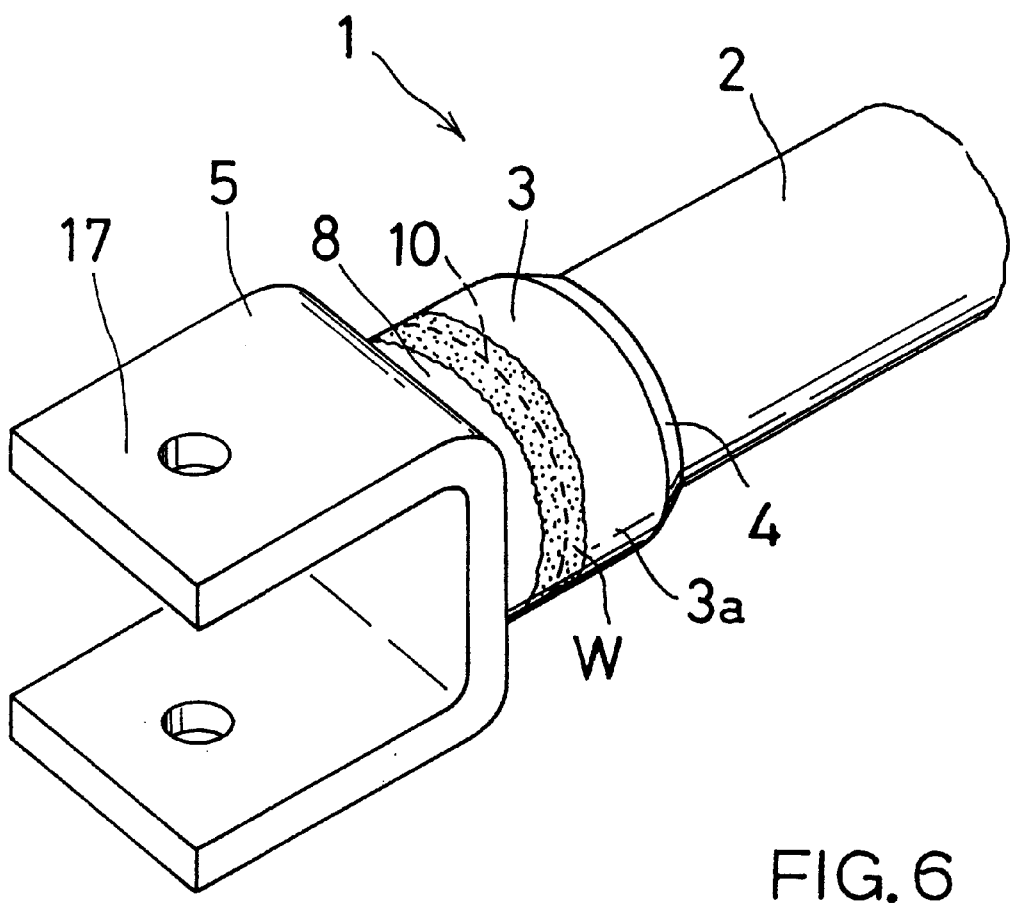
Figure 7:
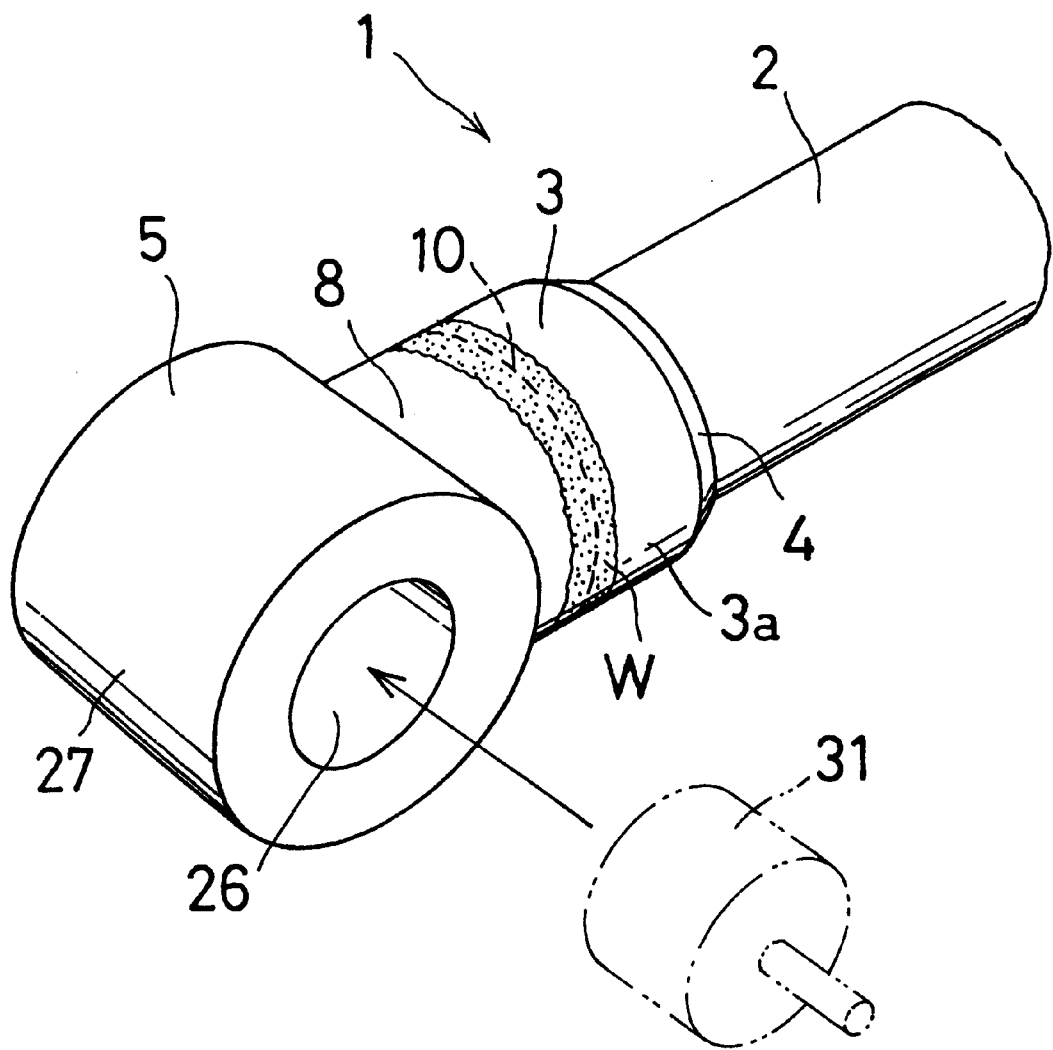
Figure 8A:
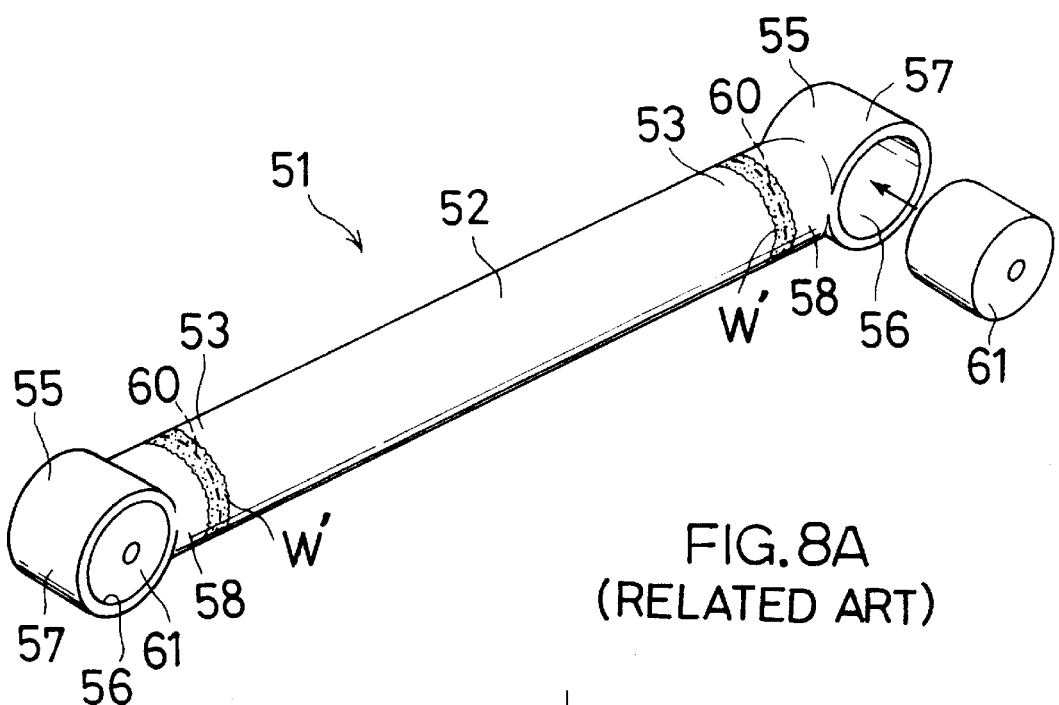
FIG. 8A is a perspective view showing an arm member according to a related art.
Figure 8B:
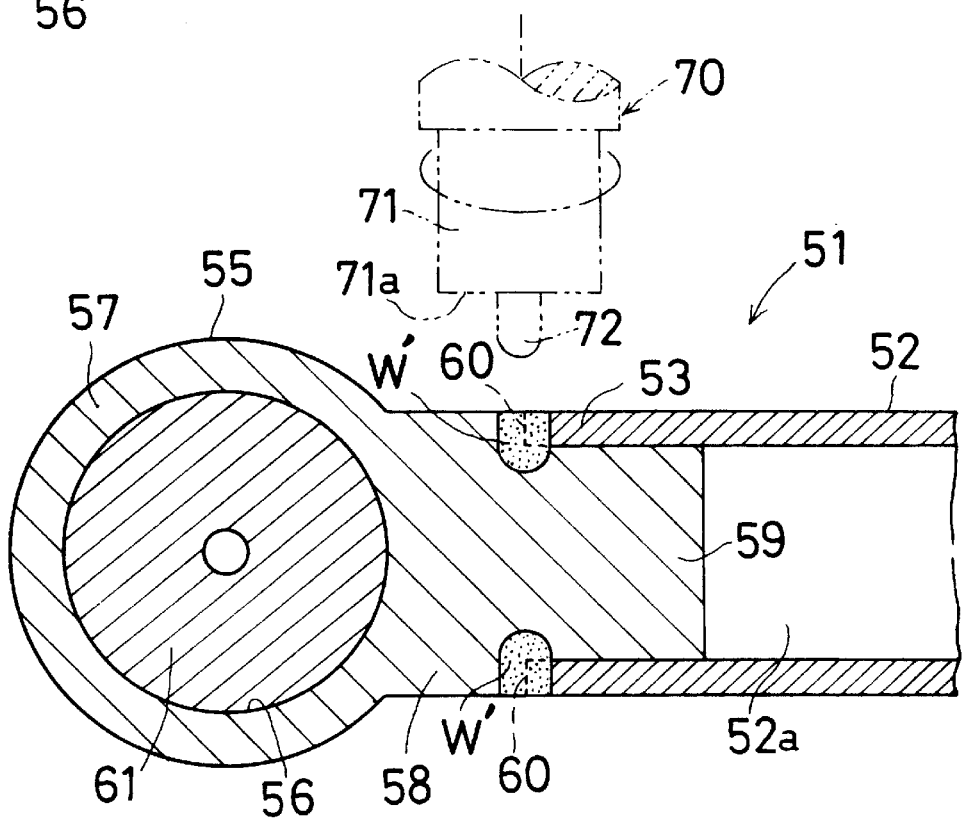
FIG. 8B is a cross-sectional view showing an end portion of a main body of the arm member shown FIG. 8A in a joined state.

The coupling member 5 is not limited to have a bushing mounting portion 7. The coupling member 5 may have a yoke portion 17 as shown in FIG. 6. The yoke portion 17 has a channel section. The coupling member 5 may have a ball joint mounting portion 27 for mounting a ball joint 31 as shown in FIG. 7. The ball joint mounting portion 27 is cylindrical and has a ball joint mounting hole 26 having a circular section.

Evaluation Example

In the arm member 1 according to the first embodiment, a tensile load was imparted to both the coupling members 5 and 5 in a longitudinal direction of the arm member 1. Then, the braking position of the arm member 1 and the braking strength were examined.

On the other hand, the same tensile test was applied to the above-mentioned arm member according to the related art.

The aluminum pipe constituting the main body 2 of the arm member 1 according to the first embodiment was the same in size and the same materials as in the arm member according to the related art, except for the radially outwardly increased thickness of the peripheral wall 3a of the end portion 3 of the main body 2.

The test revealed that the arm member 1 according to the first embodiment was broken at the longitudinal intermediate portion of the main body 2, and the arm member 51 according to the related art was broken at the joined portion W' of the main body 52.

The breaking strength of the arm member 1 according to the first embodiment was almost the same as that of the pipe member constituting the main body 2. To the contrary, the braking strength of the arm member 51 according to the related art was 60% of that of the pipe member constituting the main body 52.

As will be understood from the above test results, in order to enhance the tensile strength of the arm member 51 according to the related art up to the same level as that of the arm member 1 according to the first embodiment, it is required to increase the thickness of the pipe member constituting the main body 52 of the arm member 51 according to the related art so as to enlarge the cross-sectional area of the pipe member. Based on this knowledge, assuming that the thickness of the pipe member of the arm member 51 according to the related art is increased to have the same tensile strength as that of the arm member 1 according to the first embodiment, the weight of the arm member 51 according to the related art was calculated. The calculated result revealed that the weight of the arm member 51 according to the related art was about 3.3 times of that of the arm member according to the first embodiment. In other words, the result revealed that the weight of the arm member 1 according to the first embodiment was about 30% of that of the arm member 51 of the related art having the same tensile strength. Therefore, it was found that the weight of the arm member 1 according to the first embodiment was remarkably reduced.

According to the present invention, an arm member includes a main body made of a pipe member having a peripheral wall and a coupling member having a connecting portion, and the peripheral wall of an end portion of the main body is increased in thickness so as to be thicker than that of the other portion of the main body. The connecting portion is abutted to the peripheral wall of the end portion to form a abutted portion, and connected thereto at the abutted portion, whereby the coupling member is coupled with the main body. With this arm member, since the main body is made of a pipe member, the arm member is light in weight. Also, since the peripheral wall of the end portion of the main body is formed to have a thickness thicker than that of the other portion of the main body, there is almost no thermal fatigue due to the joining heat. Therefore, fracture or breakage would hardly occur at the joined portion or a portion approximate to the joined portion. As a result, the arm member has almost the same tensile strength as that of the pipe member constituting the main body. Therefore, the arm member is superior in strength liability.

In a case where the peripheral wall of the end portion of the main body is formed to be radially outwardly increased in thickness, the process of making the thick peripheral wall of the end portion of the main body can be simply performed.

In a case where a protruded portion formed on the connecting portion is fitted in an opening of the end portion of the main body, since the protruded portion fitted in the opening of the end portion of the main body reinforces the peripheral wall of the end portion of the main body from inside of the pipe, the mechanical strength of the peripheral wall of the end portion of the main body can be further enhanced. This can surely prevent cracks from causing at or approximate to the joined portion. Accordingly, the arm member can have a superior strength liability.

In a case where the pipe member and the coupling member are made of metal, and the abutted portions are joined by a friction agitation joining method, since the arm member has almost no thermal fatigue at the joined portion, cracks due to thermal fatigue at and approximate to the joined portion can be prevented. Accordingly, the arm member can have a superior strength liability.

Even if the main body and the coupling member are made of different metallic materials, it is possible to provide an arm member in which the main body is firmly joined to the coupling member.

In a case where the pipe member and the coupling member are made of aluminum and the abutted portions are joined by a friction agitation joining method, it is possible to provide an extremely light arm member. Furthermore, since the arm member has almost no thermal fatigue at the joined portions, cracks due to thermal fatigue at and approximate to the joined portion can be prevented. Accordingly, the arm member can have a superior strength liability.

The present invention claims priority of Japanese Patent Application Serial No. H10-247969, the content of which is incorporated hereinto by reference in its entirety.

The terms and descriptions in this specification are used only for the explanatory purposes, and the present invention is not limited to these terms and descriptions. It should be appreciated that there are many modifications and substitutions without departing from the spirit and the scope of the invention which is defined by the appended claims.

What is claimed is:

1. An arm member, comprising:
    a metallic main body made of a pipe member having a peripheral wall; and
    a metallic coupling member having a connecting portion and a non-hollow protruded portion integrally formed on said connecting portion,
        wherein said peripheral wall of an end portion of said main body is increased in thickness to have a thickness thicker than that of a portion of said main body other than said end portion,
        wherein said connecting portion is abutted to said peripheral wall of said end portion to form an abutted portion with said protruded portion inserted into an opening of said end portion, and joined to said peripheral wall by a friction agitation joining method at said abutted portion, whereby said coupling member is coupled to said main body, and
        wherein said peripheral wall of said end portion of said main body is radially outwardly increased in thickness.

2. The arm member as recited in claim 1, wherein said coupling member has a bushing mounting portion for mounting a bushing with a rubber elastic member.

3. The arm member as recited in claim 1, wherein said coupling member has a yoke portion.

4. The arm member as recited in claim 1, wherein said coupling member has a ball joint mounting portion for mounting a ball joint.

5. The arm member as recited in claim 1, wherein said pipe member and said coupling member are made of aluminum, respectively.

* * * * *